United States Patent Office 3,361,712
Patented Jan. 2, 1968

3,361,712
STABILIZATION OF PLASTICS
Henryk A. Cyba, Evanston, Ill., assignor to Universal Oil
Products Company, Des Plaines, Ill., a corporation of
Delaware
No Drawing. Filed Aug. 24, 1966, Ser. No. 574,802
7 Claims. (Cl. 260—45.75)

ABSTRACT OF THE DISCLOSURE

Stabilization of plastics against deterioration by oxidation and ultraviolet light with nickel and other metal salts of N-(2-hydroxyarylmethylene)-Y-arylamines in which Y is hydrocarbyl or hydrocarbyloxy of at least three carbon atoms, for example, the nickel salts of N-salicylidene-4-dodecylaniline and N-salicylidene-4-pentoxyaniline.

---

This is a continuation in part of copending application Ser. No. 288,504, filed June 17, 1963, and relates to the stabilization of plastics and more particularly to a novel method of inhibiting deterioration of plastic caused by oxidation and ultraviolet light.

It is well known that most, if not all, plastics undergo deterioration when exposed to sunlight and air. The deterioration due to sunlight and the deterioration due to oxygen are separate phenomena as evidenced by the fact that either one may occur in the absence of the other. It may be that deterioration from one source enhances deterioration from the other source. In any event, it is important that both forms of deterioration be inhibited and the present invention provides a novel method for accomplishing this.

Recent advances in plastic technology have made available a large variety of plastics. A definition of plastic which seems to be accepted in the industry is that plastic comprises a large and varied group of materials which consist of, or contain as an essential ingredient, a substance of high molecular weight which, while solid in the finished state, in some stage in its manufacture is soft enough to be formed into various shapes usually through the application, either singly or together, of heat and pressure. Plastics generally are prepared by the condensation or polymerization of a single monomer or a mixture of monomers. The plastic may be classified further as being thermosetting or thermoplastic. Plastics also include solid polymers which, in turn, are defined as substances of high molecular weight composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple additions of an unsaturated monomer or monomers. As hereinbefore set forth, most, if not all, plastics undergo deterioration upon exposure to air and ultraviolet light, and the present invention provides a novel method of inhibiting such deterioration.

In a preferred embodiment the plastic comprises a solid olefine polymer. This may comprise homopolymers or copolymers of olefinic hydrocarbons including particularly polyethylene, polypropylene and polybutylene, as well as copolymers of ethylene and propylene, ethylene and butylene and propylene and butylene. In addition, solid polymers prepared from one or more higher molecular weight olefins or mixtures may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused both by sunlight and air.

Another plastic available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light and oxidation.

Still other plastics are prepared from other monomers and are available commercially. Illustrative examples of such other solid polymers include phenolformaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale and polyacetals, especially polyformaldehydes.

It is understood that the plastic may be fabricated into any desired finished product including moldings, castings, fibers, films, sheets, rods, tubing or other shapes.

Rubber is composed of polymers of conjugated 1,3- dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide, silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

In one embodiment the present invention relates to a method of stabilizing plastic normally subject to deterioration by oxidation and UV light which comprises incorporating in said plastic a small but stabilizing concentration of N-(2-hydroxyarylmethylene)-Y-arylamine inhibitor or metal salt thereof, where Y is selected from the group consisting of hydrocarbyl and hydrocarbyloxy of at least three carbon atoms.

In a specific embodiment the present invention relates to a method of stabilizing solid polymer normally subject to deterioration by oxidation and UV light which comprises incorporating in said polymer a small but stabilizing concentration of a nickel salt of N-salicylidene-4-alkylaniline in which said alkyl contains from about 5 to about 20 carbon atoms.

In another embodiment the present invention relates to plastic subject to deterioration by oxidation and UV light containing, as an inhibitor against such deterioration, a stabilizing concentration of the inhibitor set forth herein.

It is believed that the inhibitors of the present invention are novel compositions of matter and accordingly are being so claimed in the present application.

The novel inhibitors of the present invention are N-(2-hydroxyarylmethylene)-Y-arylamines and metal salts thereof, the Y substituent being as hereinbefore defined. These inhibitors readily are prepared by the reaction of an alkyl or alkoxy aniline with salicylaldehyde or a substituted salicylaldehyde. This reaction occurs with the liberation of water to form a Schiff's base. In one embodiment the Schiff's base is used as the inhibitor but, in a preferred embodiment, the metal salt of the Schiff's base is used as the inhibitor. When the metal salt is prepared, it preferably is formed by the reaction of two mole proportions of the Schiff's base with one mole proportion of a metal, the latter being reacted as a compound of the metal. The salts also may be expressed as coordination complexes.

Without intending to be limited thereto, it is believed that the metal salts of the Schiff's bases may be illustrated as shown below. The structure shown below is believed to be formed by the reaction of two mole proportions of the Schiff's base, prepared by the reaction of a substituted aniline with salicylaldehyde, with one mole proportion of a nickel compound.

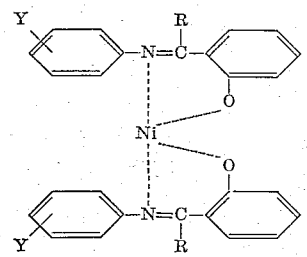

As hereinbefore set forth, Y in the above formula comprises one or more hydrocarbyl or hydrocarbyloxy groups, at least one of which contains at least three and preferably from about five to about twenty carbon atoms. It is understood that the other phenyl nucleus and/or methylene groups may contain hydrocarbyl and/or hydrocarbyloxy substituents attached thereto. In still another embodiment, 2-hydroxyacylphenones or 2-hydroxybenzophenones are used in place of salicylaldehyde for reaction with the substituted aniline. Accordingly, R in the above formula may be alkyl, phenyl, alkylphenyl or alkoxyphenyl as will be described further hereinafter.

As hereinbefore set forth, one of the reactants used in preparing the novel inhibitor of the present invention is a substituted aniline. It is essential that the aniline contains at least one hydrocarbyl or hydrocarbyloxy group of at least three carbon atoms and preferably of from about five to about twenty carbon atoms. In a preferred embodiment the substituent is an alkyl group of at least three and preferably of from five to about twenty carbon atoms. In another preferred embodiment the substituent is an alkoxy group of at least three and preferably of from about five to about twenty carbon atoms. In still another embodiment the substituent is selected from aralkyl, aryl, alkaryl, alkylcycloalkyl, cycloalkylalkyl, aryloxy, alkaryloxy, arylalkoxy, etc. When only one such substituent is attached to the aniline ring, it preferably is in the 4-position, although it may be in the 2- or 3-positions. When two or more of such substituents are present, at least one substituent preferably is in the 4-position and the other substituent or substituents will be in the 2-, 3-, 5- and/or 6-positions. While the substituted aniline is preferred, it is understood that, in another embodiment of the invention, the correspondingly substituted naphthylamine may be used for reaction with salicylaldehyde or substituted salicylaldehyde, but not necessarily with equivalent results.

The substituted aniline is reacted with salicylaldehyde or a substituted salicylaldehyde. Here again, the substituents are selected from hydrocarbyl and hydrocarbyloxy groups and more particularly those hereinbefore specifically set forth in the previous paragraph. Particularly preferred reactants in this embodiment include salicylaldehyde and ortho-vanillin (2-hydroxy-3-methoxybenzaldehyde). In another embodiment the substituted salicylaldehyde comprises a 2-hydroxyaryl alkyl ketone as illustrated by 2-hydroxyacetophenone, 2-hydroxypropiophenone, 2-hydroxybutyrophenone, 2-hydroxyvalerophenone, 2-hydroxycaprylophenone, 2-hydroxylaurylphenone, 2-hydroxypalmitylphenone, etc. In still another embodiment, the substituted salicylaldehyde comprises 2-hydroxybenzophenone, 2-hydroxy-4-alkylbenzophenone, 2-hydroxy-4'-alkylbenzophenone, 2-hydroxy-4-alkoxybenzophenone, 2-hydroxy-4'-alkoxybenzophenone, etc.

The reaction of the substituted aniline and salicylaldehyde or substituted salicylaldehyde is effected in any suitable manner. While the reaction may be effected at room temperature or slightly above, it generally is preferred to effect the reaction at refluxing conditions. The exact temperature will depend upon the particular solvent employed. For example, when benzene is used as the solvent, the temperature is about 80° C. Correspondingly higher refluxing temperatures are employed when using toluene, xylene, ethyl benzene, cumene, etc., as the solvent. In another embodiment an alcohol solvent is used including methanol, ethanol, propanol, butanol, etc., or other oxygenated solvents as ethers, glycols, etc., may be used. In general, the reaction temperature will be within the range of from room temperature or slightly higher to 200° C. or more. Higher temperatures which may range up to 300° C. may be employed when the reaction is effected under superatmospheric pressure which may range from 10 to 1000 pounds per square inch or more. When desired, the substituted aniline and/or salicylaldehyde compound may be prepared as separate solutions in a solvent and introduced in this manner into the reaction zone, or either one or both of these compounds may be introduced into the reaction zone and the solvent separately supplied thereto. The refluxing and/or stirring of the heated reactants is continued for a time sufficient to effect substantially complete reaction, which time may range from 0.1 to 10 hours or more. In this reaction, water is formed and preferably is continuously removed from the reaction zone. Following completion of the reaction, the resultant Schiff's base may be separated from the solvent or may be allowed to remain in solution.

In a particularly preferred embodiment the metal salt of the Schiff's base is used as the inhibitor. Any suitable metal salt may be used, the nickel salt being preferred. Other metals include copper, cobalt, lithium, antimony, cadmium, lead, tin, uranium ($UO_2$), vanadium, zinc, iron, mercury, etc. Any suitable metal compound is used in preparing the salt. A preferred compound of nickel is nickel chloride. Other soluble salts of nickel include nickel acetate, tetrahydrate, nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

The Schiff's base is reacted with the metal compound in any suitable manner. For example, the Schiff's base in alcoholic solution is first reacted with an alkali metal hydroxide alcoholic solution and then is reacted with nickel chloride. The reaction temperature generally will be in the range of from about 20° C. to refluxing temperature which may be as high as 200° C. In certain cases, it is unnecessary to first react with an alkali metal hydroxide as, for example, when the lithium salt is prepared. Preferred alkali metal hydroxides comprise sodium hydroxide and potassium hydroxide, although other alkali metal hydroxide solutions may be used, as well as calcium, magnesium, strontium or barium hydroxides.

The substituted aniline and salicylaldehyde compounds are reacted in equal mole proportions, with the liberation of one mole proportion of water. When desired, an excess of one of the reactants may be present in order to assure complete reaction. The resultant Schiff's base preferably is reacted in a proportion of two moles thereof per one mole of the metal compound. Here again, an excess of one of the reactants may be present to assure complete reaction. The alkali metal hydroxide is used in an equal mole proportion to the Schiff's base, although an excess may be used in order to assure complete reaction.

It is believed that the reaction proceeds first by the formation of the Schiff's base, then the replacement of the hydrogen with the alkali metal on the hydroxyl group and subsequent formation of the metal salt by reaction with the nickel compound. For example, 4-octylaniline is reacted with salicylaldehyde to form N-salicylidene - 4-octylaniline. This reacts with sodium hydroxide to form the corresponding salt. Subsequently, the sodium is removed by reaction with nickel chloride, for example, to form sodium chloride and the coordination complex or nickel salt.

As hereinbefore set forth, the inhibitors of the present invention are N-(2-hydroxyarylmethylene)-Y-arylamines and metal salts thereof. Illustrative compounds include N-salicylidene-4-propylaniline,
N-salicylidene-4-butylaniline,
N-salicylidene-4-pentylaniline,
N-salicylidene-4-hexylaniline,
N-salicylidene-4-heptylaniline,
N-salicylidene-4-octylaniline,
N-salicylidene-4-nonylaniline,
N-salicylidene-4-decylaniline,
N-salicylidene-4-undecylaniline,
N-salicylidene-4-dodecylaniline,
N-salicylidene-4-tridecylaniline,
N-salicylidene-4-tetradecylaniline,
N-salicylidene-4-pentadecylaniline,
N-salicylidene-4-hexadecylaniline,
N-salicylidene-4-heptadecylaniline,
N-salicylidene-4-octadecylaniline,
N-salicylidene-4-nonadecylaniline,
N-salicylidene-4-eicosylaniline, etc., corresponding compounds in which the alkyl group is in the 2-position, corresponding compounds in which the alkyl group is in the 3-position, corresponding compounds containing two alkyl groups in the 2,4- or 3,4-positions on the aniline ring, etc., N-salicylidene-4-propoxyaniline, N-salicylidene-4-butoxyaniline, N-salicylidene-4 - pentoxyaniline, N-salicylidene-4-hexoxyaniline, N-salicylidene - 4-heptoxyaniline, N-salicylidene-4-octoxyaniline, N-salicylidene-4-nonoxyaniline, N-salicylidene-4-decoxyaniline, N-salicylidene-4-undecoxyaniline, N-salicylidene-4-dodecoxyaniline, etc., corresponding compounds in which the alkoxy group is in the 3-position, corresponding compounds containing two alkoxy groups in the 2,4- or 3,4-positions on the aniline ring, etc., corresponding compounds containing one alkyl and one alkoxy group, corresponding compounds in which the alkyl and/or alkoxy group is replaced by an aralkyl, aryl, alkaryl, cycloalkyl, cycloalkylalkyl, alkylcycloakyl, etc. substituent. The akyl group may be a straight chain substituent or branched in varying degree. The attachment to the aromatic nucleus may be on the terminal carbon atom or on one of the internal carbon atoms.

Additional illustrative compounds include

N-[(2-hydroxyphenyl)(methyl)methylene]-4-propylaniline,
N-[(2-hydroxyphenyl)(methyl)methylene]-4-butylaniline,
N-[(2-hydroxyphenyl)(methyl)methylene]-4-pentylaniline,
N-[(2-hydroxyphenyl)(methyl)methylene]-4-hexylaniline,
N-[(2-hydroxyphenyl)(methyl)methylene]-4-heptylaniline,
N-[(2-hydroxyphenyl)(methyl)methylene]-4-octylaniline,
N-[(2-hydroxyphenyl)(methyl)methylene]-4-nonylaniline,
N-[(2-hydroxyphenyl)(methyl)methylene]-4-decylaniline,
N-[(2-hydroxyphenyl)(methyl)methylene]-4-undecylaniline,
N-[(2-hydroxyphenyl)(methyl)methylene]-4-dodecylaniline, etc., corresponding compounds in which the methyl group is replaced by a higher alkyl group selected from ethyl, propyl, butyl, pentyl, hexyl, heptyl, octyl, nonyl, decyl, undecyl, dodecyl, etc., corresponding compounds in which the aniline ring contains two or three alkyl groups preferably selected from those specifically recited herein, corresponding compounds in which the aniline ring contains alkoxy, aryloxy and/or cycloalkoxy substituents, corresponding compounds in which the ring attached to the methylene group also contains one or more alkyl, alkoxy, aryloxy and/or cycloalkoxy substituents. The first compound listed above is prepared by the reaction of 2-hydroxyacetophenone with 4 - propylaniline. The remaining compounds in the above list are prepared in substantially the same manner except that the corresponding reactants will be used. Also, when desired, in place of 2-hydroxyacetophenone, one will use 2-hydroxypropiophenone, 2-hydroxybutyrophenone, etc.

In still another embodiment the inhibitor is prepared by the reaction of the substituted arylamine with a benzophenone. Illustrative compounds in this embodiment include N-[(2-hydroxyphenyl)(phenyl)methylene]-4-propylaniline,
N-[(2-hydroxyphenyl)(phenyl)methylene]-4-butylaniline,
N-[(2-hydroxyphenyl)(phenyl)methylene]-4-pentylaniline,
N-[(2-hydroxyphenyl)(phenyl)methylene]-4-hexylaniline,
N-[(2-hydroxyphenyl)(phenyl)methylene]-4-heptylaniline,
N-[(2-hydroxyphenyl)(phenyl)methylene]-4-octylaniline, N-[(2-hydroxyphenyl)(phenyl)methylene]-4-nonyl-
aniline,
N-[(2-hydroxyphenyl)(phenyl)methylene]-4-decyl-
aniline,
N-[(2-hydroxyphenyl)(phenyl)methylene]-4-undecyl-
aniline,
N-[(2-hydroxyphenyl)(phenyl)methylene]-4-dodecyl-
aniline, etc.

corresponding compounds in which the aniline ring contains two or three alkyl groups preferably selected from those specifically recited herein, corresponding compounds in which the aniline ring contains alkoxy, aryloxy and/or cycloalkoxy substituents, corresponding compounds in which the aniline ring contains one alkyl and one alkoxy group, corresponding compounds in which one or both of the benzophenone rings contain one or more alkyl, alkoxy, aryloxy and/or cycloalkoxy substituents. The first compound in the above list is prepared by the reaction of 4-propylaniline with 2-hydroxybenzophenone. Here again, the other compounds in the list will be prepared in substantially the same manner except that the corresponding reactants will be used.

As hereinbefore set forth, another embodiment of the invention comprises the metal salts of the specific compounds enumerated above. A preferred metal salt comprises the nickel salt. Other preferred salts comprise the lithium salt, copper salt and cobalt salt. Still other metals have been set forth hereinbefore. In the interest of simplicity, the metal salts of the specific compounds recited above are not repeated here, but it is understood that the metal salts of the specific compounds hereinbefore set forth are definitely comprised as part of the present invention.

From the above description, it will be seen that a number of different compounds and salts thereof may be prepared and used in accordance with the present invention. However, all of these are not necessarily equivalent in the same or different plastic.

In addition to serving to inhibit deterioration of plastic due to oxidation and ultraviolet light, the additives of the present invention also serve as mold release agents, anti-blocking agents, anti-static agents, dyeing aids, etc. These additional advantages are of importance in the manufacture and use of the plastics.

While the compounds described herein are particularly useful for the stabilization of plastics, it is understood that these compounds, including the metal salts, also will have utility in some applications. For example, the metal salts of some of these compounds act as anti-knock agents to increase the anti-knock properties of gasoline. Also, some of these compounds are useful as additives to other organic substrates which may include kerosene, lubricating oil, fuel oil, grease, asphalt, adhesives, paints, etc. The compounds also are useful as catalysts, especially in the formation of acrylic esters from carbon monoxide, acetylene and alcohol.

The inhibitor of the present invention is incorporated in the plastic or other substrate in a stabilizing concentration which may range from about 0.05% to about 10% by weight and preferably from about 0.5% to about 2% by weight of the substrate. The inhibitor may be incorporated in the plastic in any suitable manner and at any suitable state of preparation. Because the inhibitor may inhibit polymerization of the monomer, it generally is preferred to incorporate the inhibitor after the plastic is formed. In one method the plastic is recovered as powder, pellets, cylinders, spheres, sheets, rolls, bars, etc., and these may be commingled with the inhibitor in any suitable manner such as by partly melting the plastic and adding the inhibitor to the hot melt. This is readily accomplished, for example, by heating the plastic on a steam heated two-roll mill of conventional commercial design and adding the inhibitor during this operation. The plastic containing the inhibitor is recovered in sheet form and may be fabricated in any desired manner. In another method, the inhibitor is added in a Banbury mixer, an extruder or in any other suitable manner. When fibers are desired, the inhibited plastic is recovered from the Banbury mixer and is extruded through a spinnerette.

The inhibitor is utilized as such or is prepared as a solution in a suitable solvent including alcohols, and particularly methanol, ethanol, propanol, butanol, etc., hydrocarbons and particularly benzene, toluene, xylene, cumene, etc. However, the solvent must not be detrimental to the plastic and, therefore, a preferred solvent comprises the same solvent used during the manufacture or working of the plastic. It is understood that the inhibitor also may be used along with other additives incorporated in plastics for various purposes. For example, in colored plastics carbon black is used in a concentration of below about 5% by weight and generally of from about 1% to about 3% by weight. Similarly, pigments, zinc oxide, titanium oxide, etc., may be incorporated in plastics, the oxides usually being employed in a concentration of from about 2% to about 10% by weight. In many cases, silicates, dyes and/or fillers also are incorporated in the plastic.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, dialkylated phenols, trialkylated phenols, alkyl-alkoxyphenols, diphenyl - p - phenylenediamine, 1,1,3-tris - (2-methyl-4-hydroxy-5-t-butylphenyl)-butane, Salol (salicylic acid esters), p-octylphenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc. Other ultraviolet light stabilizers include nickel-bis-dithiocarbamates, nickel-bis-dihydroxypolyalkylphenol sulfides, dilauryl beta - mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

*Example 1*

The compound of this example is N-salicylidene-4-dodecylaniline and was prepared by the reaction of 4-dodecylaniline with salicylaldehyde. This preparation was made by refluxing a mixture of 65.25 g. (0.25 mole) of dodecylaniline, 30.5 g. (0.25 mole) of salicylaldehyde and 200 g. of benzene. 4.5 cc. of water was collected in four hours, which corresponds to the theoretical amount of water which should be liberated in this reaction. Following completion of the reaction, the benzene was removed by distillation under vacuum. 77 g. of N-salicylidene-4- dodecylaniline were recovered as a yellow viscous liquid. Analysis indicated a basic nitrogen of 2.85 meq./g. and a basic equivalent weight of 352 which corresponds to the theoretical weight of 365.

*Example 2*

This example describes the preparation of the nickel salt of N-salicylidene-4-dodecylaniline prepared as described in Example 1. The nickel salt was prepared by partially dissolving 36.5 g. (0.10 mole) of N-salicylidene-4-dodecylaniline in 200 g. of methanol and adding thereto 6.5 g. (0.10 mole) of potassium hydroxide dissolved in 100 g. of methanol. The mixture was stirred and formed a homogeneous yellow solution. Then 11.89 g. (0.05 mole) of nickelous chloride dissolved in 150 g. of hot methanol were added dropwise to the mixture with intimate stirring. The nickel salt of N-salicylidene-4-dodecylaniline formed as a green precipitate, and was removed from the liquid menstruum and washed both with hot water and then with methanol. The powder had a melting point of 92–95° C. and a nickel content of 8.25% which corresponds to the theoretical nickel content of 7.43%.

Example 3

N-salicylidene-4-nonylaniline was prepared by refluxing 54.25 g. (0.25 mole) of 4-nonylaniline, 30.50 g. (0.25 mole) of salicylaldehyde and 200 g. of xylene for six hours. A total of 4.3 cc. of water was collected. Following completion of the reaction, the xylene was removed by distillation under vacuum. A yield of 84% by weight of the theoretical was obtained. The product had a basic nitrogen content of 3.01 meq./g. and an equivalent weight of 333 which corresponds to the theoretical weight of 323.

Example 4

The nickel salt of N-salicylidene-4-nonylaniline, prepared as described in Example 3, was prepared by commingling 33 g. (0.10 mole) of N-salicylidene-4-nonylaniline dissolved in 150 g. of methanol with 6.5 g. (0.10 mole) of potassium hydroxide dissolved in 75 g. of warm methanol. The mixture was vigorously mixed and then heated to reflux. To the refluxing mixture there was added dropwise 11.89 g. (0.05 mole) of nickelous chloride dissolved in 100 g. of warm methanol. The nickel salt precipitated and was removed from the liquid menstruum. The nickel salt was analyzed and found to have a nickel content of 7.16% by weight which corresponds to the theoretical nickel content of 8.3%.

Example 5

This example describes the preparation of N-salicylidene-4-sec-butylaniline and was prepared by refluxing 78 g. (0.5 mole) of 4-sec-butylaniline, 61 g. (0.5 mole) of salicylaldehyde and 200 g. of benzene for three hours. 9 cc. of water was collected which corresponds to the theoretical amount of water which should be liberated in the reaction. Following completion of the reaction, benzene was removed by distillation under vacuum and N-salicylidene-4-sec-butylaniline was recovered as an orange colored liquid.

Example 6

This example describes the preparation of the nickel salt of N-salicylidene-4-sec-butylaniline prepared as described in Example 5. The nickel salt was prepared by dissolving 25.3 g. (0.10 mole) of N-salicylidene-4-sec-butylaniline dissolved in 150 g. of methanol and intimately mixing to form a homogeneous orange solution. To this solution was added 6.5 g. (0.10 mole) of potassium hydroxide dissolved in 75 g. of warm methanol with continued stirring, following which 11.89 g. (0.05 mole) of nickelous chloride dissolved in 75 g. of warm methanol were added dropwise. Initimate mixing was continued. The nickel salt of N-salicylidene-4-sec-butylaniline was recovered as a light green solid.

Example 7

The compound of this example is N-o-vanillidene-4-dodecylaniline and was prepared by the reaction of 65 g. (0.25 mole) of 4-dodecylaniline with 38 g. (0.25 mole) of o-vanillin in the presence of 200 g. of toluene. The reaction was effected at 120° C. for 2.5 hours and 4.5 cc. of water was collected. This corresponds to the theoretical amount of water. The toluene was removed by distillation under vacuum and the product was recovered as an orange-red oil. The yield of 97 g. of product corresponds to 98% of the theoretical yield. The product had a basic nitrogen content of 2.44 meq./g. and an equivalent weight of 413.

Example 8

The nickel salt of N-o-vanillidene-4-dodecylaniline, prepared as described in Example 7, was prepared by reacting 39.5 g. (0.10 mole) of the N-o-vanillidene-4-dodecylaniline dissolved in 150 g. of methanol with 6.5 g. (0.10 mole) of potassium hydroxide dissolved in 75 g. of warm methanol. The reaction was effected with intimate stirring and heating to reflux. Then 11.89 g. (0.05 mole) of nickelous chloride dissolved in 75 g. of warm methanol were added gradually to the refluxing mixture. Refluxing and mixing was continued for two hours, after which the product was recovered by vacuum filtering and precipitation with water. The nickel salt was recovered as a green-yellow solid having a melting point of 87–91° C. and a percent nickel of 6.81 which corresponds to the theoretical nickel content of 6.95%.

Example 9

The compound of this example is N-[(2-hydroxyphenyl) - (methyl)methylene]-4-dodecylaniline and was prepared by the reaction of 27.2 g. (0.20 mole) of 2-hydroxyacetophenone with 52.2 g. (0.20 mole) of 4-dodecylaniline in xylene solvent at 180° C. for six hours. 3.2 cc. of water was collected. Following completion of the reaction, the xylene was removed by distillation under vacuum and N-[(2-hydroxyphenyl)(methyl)methylene]-4-dodecylaniline was recovered as a red-yellow oil having a basic nitrogen of 2.78 meq./g. and a basic molecular weight of 359 which corresponds to the theoretical molecular weight of 379.

Example 10

The nickel salt of N-[(2-hydroxyphenyl)(methyl)methylene]-4-dodecylaniline, prepared as described in Example 9, was prepared by reacting 37.9 g. (0.10 mole) of this Schiff's base mixed with 200 g. of methanol with 6.5 g. (0.10 mole) of potassium hydroxide dissolved in 100 g. of warm methanol. The mixture was heated to reflux and 11.89 g. (0.05 mole) of nickelous chloride dissolved in 125 g. of warm methanol were added dropwise thereto. Refluxing was continued for two hours, after which the product was washed with warm water and warm methanol. The nickel salt was recovered as a light-green precipitate having a melting point of 193–195° C. and a nickel content of 12.79%.

Example 11

N - [(2 - hydroxy - 4 - methoxyphenyl)(phenyl)methlyene]-4-dodecylaniline was prepared by refluxing 45 g. (0.20 mole) of 2-hydroxy-4-methoxybenzophenone, 52.2 g. (0.20 mole) of 4-dodecylamine and 200 g. of xylene. After completion of the reaction, the xylene was removed by distillation under vacuum and the product was recovered as a red colored liquid having a basic nitrogen of 1.81 meq./g.

Example 12

The nickel salt of N-[(2-hydroxy-4-methoxyphenyl)(phenyl)methylene]-4-dodecylaniline, prepared as described in Example 11, was prepared by reacting 47.1 g. (0.10 mole) of this Schiff's base mixed with 100 g. of methanol and 6.5 g. (0.10 mole) of potassium hydroxide dissolved in 100 g. of warm methanol. This reaction was effected by heating to refluxing temperature and then 11.89 g. (0.05 mole) of nickelous chloride dissolved in 100 g. of warm methanol were added gradually to the refluxing mixture. Reflux was continued for two hours. The nickel salt was recovered as a light-green solid having a melting point of 168–177° C. and a nickel content of 6.6%.

Example 13

N-salicylidene-4-pentoxyaniline was prepared by refluxing 33 g. (0.184 mole) of 4-pentoxyaniline, 22.45 g. (0.184 mole) of salicylaldehyde and 100 g. of benzene for eight hours. 3.3 cc. of water was collected which corresponds to the theoretical amount of water. After completion of the reaction, the benzene was removed by vacuum distillation and the product was recovered, after crystallization from methanol-water, as a solid having a basic nitrogen of 3.5 meq./g. and an equivalent weight of 283, which corresponds to the theoretical weight of 283.

Example 14

The nickel salt of N-salicylidene-4-pentoxyaniline, prepared as described in Example 13, was prepared by dissolving 18.8 g. (1/15 mole) of N-salicylidene-4-pentoxyaniline in 200 g. of methanol and gradually adding thereto 4.32 g. (1/15 mole) of potassium hydroxide dissolved in 75 g. of warm methanol. The mixture was stirred at room temperature and then 7.98 g. (1/30 mole) of nickelous chloride dissolved in 75 g. of warm methanol were added gradually thereto with continued stirring. A solid green precipitate was recovered by filtering, washing and distillation. The nickel salt was recovered as a green solid having a melting point of 95–101° C.

Example 15

N-salicylidene-4-decycloxyaniline was prepared by refluxing a mixture of 25.13 g. (0.10 mole) of 4-decyloxyaniline, 12.2 g. (0.10 mole) of salicylaldehyde and 200 g. of xylene for four hours. 1.8 cc. of water was collected, which corresponds to the theoretical amount of water. Xylene was removed by vacuum distillation and the product was recovered by crystallization. N-salicylidene-4-deccyloxyaniline was recovered as a yellow solid having a melting point of 75–80 C., a basic nitrogen of 2.78 meq./g. and an equivalent weight of 358, which corresponds to the theoretical weight of 353.

Example 16

The nickel salt of N-salicylidene-4-decycloxyaniline, prepared as described in Example 15, was prepared by reacting 14.1 g. (1/25 mole) of N-salicylidene-4-decyloxyaniline with 2.6 g. (1/25 mole) of potassium hydroxide and then with 4.75 g. (1/50 mole) of nickelous chloride. Methanol was used as a solvent in this reaction. The nickel salt was recovered as a dark green oil in a yield of 85%.

Example 17

The compound of this example is N-salicylidene-4-dodecycloxyaniline and was prepared by refluxing 70.7 g. (0.25 mole) of 4-dodecycloxyaniline, 30.5 g. (0.25 mole) of salicylaldehyde and 200 g. of benzene. Refluxing was continued for three hours and 4.5 cc. of water was collected, which corresponds to the theoretical amount of water. Following completion of the reaction, the product was recovered as yellow crystals having a melting point of 70–71° C. and a basic nitrogen of 2.68 meq./g. and an equivalent weight of 373, which corresponds to the theoretical weight of 381.

Example 18

The nickel salt of N-salicylidene-4-dodecyloxyaniline, prepared as described in Example 17, was prepared by first mixing 38.1 g. (0.10 mole) of N-salicylidene-4-dodecyloxyaniline with 200 g. of methanol, stirring and heating to reflux temperature. Then 6.5 g. (0.10 mole) of potassium hydroxide in 100 g. of methanol were gradually added to the mixture and heating and stirring was continued. Following this, 11.89 g. (0.05 mole) of nickelous chloride in 75 g. of warm methanol were added gradually with continued mixing and refluxing. Following completion of the reaction, the nickel salt was recovered as a green solid.

Example 19

The compound of this example is N-[(2-hydroxyphenyl)(methyl)methylene]-4-dodecyloxyaniline and was prepared by refluxing 27.2 g. (0.20 mole) of 2-hydroxyacetophenone, 56.6 g. (0.20 mole) of 4-dodecyloxyaniline and 100 g. of xylene for about seven hours. 3 cc. of water was collected. The product was recovered as a tan colored solid having a melting point of 47–53° C., a basic nitrogen of 2.52 meq./g. and an equivalent weight of 397, which corresponds to the theoretical weight of 395.

Example 20

The nickel salt of N-[(2-hydroxyphenyl)(methyl)methylene]-4-dodecyloxyaniline, prepared as described in Example 19, was prepared by reacting 19.8 g. (0.05 mole) of this Schiff's base with 3.25 g. (0.05 mole) of potassium hydroxide and then reacting with 5.95 g. (0.025 mole) of nickelous chloride by intimately mixing at room temperature for about one hour. Methanol was used as a solvent in the reaction mixture. The nickel salt was recovered as a light green solid having a melting point of 270–285° C. and a nickel content of 7.46%.

Example 21

The cobalt salt of N-salicylidene-4-dodecylaniline was prepared by reacting 18.25 g. (0.05 mole) of N-salicylidene-4-dodecylaniline with 3.25 g. (0.05 mole) of potassium hydroxide and then with 4.325 g. (0.025 mole) of cobalt sulfate dissolved in 250 g. of hot water. The cobalt salt was recovered as a black tarry material. Analysis showed this product to contain 5.92% of cobalt.

Example 22

The copper salt of N-salicylidene-4-propylaniline is prepared by reacting one mole proportion of N-salicylidene-4-propylaniline with sodium hydroxide and then reacting with 0.5 mole proportion of cupric acetate. The copper salt is recovered as the precipitate after vacuum filtration and washing with warm water and warm methanol.

Example 23

The nickel salt of N-salicylidene-4-dodecylaniline, prepared as described in Example 2, was evaluated as an inhibitor in a special batch of commercial solid polypropylene. This special batch of solid polypropylene was obtained free of any inhibitors in order that it may be used as a proper control sample to evaluate the effect of different inhibitors.

The solid polypropylene used in this example is stated to have the following properties:

TABLE 1

| | |
|---|---|
| Specific gravity | 0.910–0.920 |
| Refractive index, $n_D^{25}$ | 1.510 |
| Heat distortion temperature: | |
| At 66 p.s.i. load, ° F. | 240 |
| At 264 p.s.i. load, ° F. | 150 |
| Tensile yield strength, p.s.i. (ASTM D-638-58T) (0.2″ per min.) | 4700 |
| Total elongation, percent | 300–400 |
| Stiffness flexural (ASTM D747-50) $10^5$ p.s.i. | 1.8 |
| Shore Hardness D (ASTM D676-55T) | 74 |

In one method the solid polypropylene was evaluated in an Atlas type DL-TS Weather-Ometer. The Weather-Ometer may be operated with or without the use of water sprays to simulate accelerated moist weathering. In the present runs, the water sprays were not used, thereby simulating and accelerating the effect of hot airy weathering. Polypropylene pellets were milled in a two-roll heated mill of conventional commercial design and the inhibitor was incorporated in the samples during the milling. The samples were pressed into sheets of 17 mil. thickness and cut into plaques of 1⅜″ x 1½″. The plaques then were inserted into plastic holders, affixed onto a rotating drum and exposed to carbon arc rays at about 52° C. in the Weather-Ometer. Periodically samples of the polypropylene were subjected to infrared analysis and the intensity of the carbonyl band at 1715 cm.$^{-1}$ was determined and expressed as "carbonyl number." As hereinbefore set forth, the formation of carbonyl groups is an indication of deterioration of the polyolefin. The higher intensity of the carbonyl band indicates a higher carbonyl concentration (expressed as carbonyl number) and accordingly increased deterioration. The number of hours required to effect an increase in carbonyl content of 100 numbers is taken as the induction period.

Samples of the polypropylene also were evaluated by outdoor exposure. The plaques of polypropylene prepared as described in Example 4, also was evaluated in an outdoor rack facing south and inclined at a 45° angle at Des Plaines, Ill. The samples were analyzed for carbonyl formation in the manner described in the previous paragraph. Here again, the number of days required to effect an increase in carbonyl content of 100 numbers is taken as the induction period.

The results of evaluations in the Weather-Ometer and outdoor exposure are reported in the following table for a sample of the polypropylene without added inhibitor and for a sample containing 1% by weight of the nickel salt of N-salicylidene-4-dodecylaniline.

TABLE 2

| Additive | Weather-Ometer Induction Period (Hours) | Outdoors Induction Period (Days) |
|---|---|---|
| None | <48 | <54 |
| 1% by wt. of nickel salt of N-salicylidene-4-dodecylaniline | 1,248 | >207 |

From the data in the above table, it will be seen that this inhibitor was effective in retarding deterioration of the polypropylene.

*Example 24*

The nickel salt of N-salicylidene-4-nonylaniline, prepared as described in Example 4, also was evaluated in another sample of the polypropylene described in Example 23. The results of these evaluations are reported in the following table. For comparative purposes, the results using the polypropylene without the inhibitor are repeated in the table.

TABLE 3

| Additive | Weather-Ometer Induction Period (Hours) | Outdoors Induction Period (Days) |
|---|---|---|
| None | <48 | <54 |
| 1% by wt. of nickel salt of N-salicylidene-4-nonylaniline | >1,344 | >168 |

The sample containing inhibitor in the outdoor exposure had an initial carbonyl reading of 183 days. After 168 days the carbonyl reading was 233. The test is still being continued because this sample had not as yet developed an increase of 100 numbers in carbonyl content.

From the data in the above table, it will be seen that the inhibitor was effective in inhibiting deterioration of the polypropylene.

*Example 25*

The nickel salt of N-o-vanillidene-4-dodecylaniline, prepared as described in Example 8, also was evaluated in another sample of the polypropylene described in Example 23. The results of these evaluations are reported in the following table. Here again, the results of the evaluations made with the polypropylene without the inhibitor are repeated for comparative purposes.

TABLE 4

| Additive | Weather-Ometer Induction Period (Hours) | Outdoors Induction Period (Days) |
|---|---|---|
| None | <48 | <54 |
| 1% by wt. of nickel salt of N-o-vanillidene-4-dodecylaniline | 1,440 | 207 |

Here again, it will be noted that the inhibitor served to decrease deterioration of the polypropylene.

*Example 26*

The nickel salt of N-[(2-hydroxyphenyl)(methyl)-methylene]-4-dodecylaniline, prepared as described in Example 10, also was evaluated in another sample of the polypropylene described in Example 23. The data are reported in the following table, which also repeats the results obtained when using a sample of the polypropylene without the inhibitor.

TABLE 5

| Additive | Weather-Ometer Induction Period (Hours) | Outdoors Induction Period (Days) |
|---|---|---|
| None | <48 | <54 |
| 1% by weight of nickel salt of N-[(2-hydroxyphenyl)-(methyl)methylene]-4-dodecylaniline | 1,032 | 227 |

Here again, it will be noted that the inhibitor was effective in retarding deterioration of the polypropylene.

*Example 27*

The nickel salt of N-[(2-hydroxy-4-methoxyphenyl)-(phenylmethylene]-4-dodecylaniline, prepared as described in Example 12, also was evaluated in another sample of the polypropylene described in Example 23. The results of these evaluations and of a sample of the polypropylene without inhibitor are reported in the following table.

TABLE 6

| Additive | Weather-Ometer Induction Period (Hours) | Outdoors Induction Period (Days) |
|---|---|---|
| None | <48 | <54 |
| 1% by wt. of nickel salt of N-[(2-hydroxy-4-methoxyphenyl)(phenyl)-methylene]-4-dodecylaniline | 936 | >274 |

Here again, it will be seen that the inhibitor served to retard deterioration of the polypropylene.

*Example 28*

The nickel salt of N-salicylidene-4-dodecyloxyaniline, prepared as described in Example 18, also was evaluated in another sample of the polypropylene described in Example 23. The results of these evaluations are shown in the following table, along with the results obtained in evaluating the polypropylene without the inhibitor.

TABLE 7

| Additive | Weather-Ometer Induction Period (Hours) | Outdoors Induction Period (Days) |
|---|---|---|
| None | <48 | <54 |
| 1% by wt. of nickel salt of N-salicylidene-4-dodecyloxyaniline | 1,896 | 233 |

The data in the above table show that the inhibitor is effective in retarding deterioration of the polypropylene.

*Example 29*

Another sample of the nickel salt of N-salicylidene-4-dodecylaniline, prepared as described in Example 2, was evaluated in another commercial solid polypropylene. Here again, the polypropylene used in this run was a special sample free of added inhibitor. This polypropylene was evaluated in the Weather-Ometer and in outdoor exposure in the same manner described in Example 23, and the results thereof are reported in the following table. Also included in the table are the results obtained when using the polypropylene free of added inhibitor.

TABLE 8

| Additive | Weather-Ometer Induction Period (Hours) | Outdoors Induction Period (Days) |
|---|---|---|
| None | <24 | <14 |
| 1% by wt. of nickel salt of N-salicylidene-4-dodecylaniline | 1,200 | 268 |

From the data in the above able, it will be seen that the inhibitor was effective in retarding deterioration in this different commercial polypropylene.

*Example 30*

This example reports evaluations made in a special batch of commercial solid polyethylene. As hereinbefore set forth, a special batch of the solid polyolefin was obtained free of any inhibitors in order that it may be used as a proper control sample to evaluate the effect of different inhibitors. The solid polyethylene is of the high density type and the inhibited product is marketed commercially.

A sample of the polyethylene without inhibitor and a sample of the polyethylene with 1% by weight of the nickel salt of N-salicylidene-4-dodecylaniline, prepared as described in Example 2, were evaluated in both the Weather-Ometer and in outdoor exposure in the same manner described in Example 23. The results of these tests are reported in the following table.

TABLE 9

| Additive | Weather-Ometer Induction Period (Hours) | Outdoors Induction Period (Days) |
|---|---|---|
| None | 192 | 42 |
| 1% by wt. of nickel salt of N-salicylidene-4-dodecylaniline | 3,408 | >401 |

From the data in the above table, it will be seen that the inhibitor was extremely effective in retarding deterioration of the polyethylene. The sample of polyethylene containing inhibitor which was exposed outdoors had an initial carbonyl reading of 37 and this reading was only 82 after 401 days. Because this sample had not reached an increase in carbonyl number of 100 units, the evaluation is being continued.

*Example 31*

The nickel salt of N-o-vanillidene-4-dodecylaniline, prepared as described in Example 8, also was evaluated in another sample of the polyethylene described in Example 30. The results of these evaluations are reported in the following table, along with a repeat of the results obtained with samples of the polyethylene free of added inhibitor.

TABLE 10

| Additive | Weather-Ometer Induction Period (Hours) | Outdoors Induction Period (Days) |
|---|---|---|
| None | 192 | 42 |
| 1% by wt. of nickel salt of N-o-vanillidene-4-dodecylaniline | 3,168 | >381 |

It will be seen that this inhibitor was extremely effective in retarding deterioration of the polyethylene. Furthermore, the sample containing inhibitor which was exposed outdoors increased in carbonyl content from an initial reading of 32 to a reading of 88 after 381 days. It will be noted that this sample had not reached an increase in 100 units and the evaluation accordingly is being continued.

*Example 32*

The nickel salt of N-[(2-hydroxyphenyl)(methyl)-methylene]-4-dodecylaniline, prepared as described in Example 10, also was evaluated in another sample of the polyethylene described in Example 30, with the following results:

TABLE 11

| Additive | Weather-Ometer Induction Period (Hours) | Outdoors Induction Period (Days) |
|---|---|---|
| None | 192 | 42 |
| 1% by wt. of nickel salt of N-[(2-hydroxyphenyl)(methyl)methylene]-4-dodecylaniline | 2,256 | >381 |

Here again, an increase in 100 units had not been reached in the sample containing inhibitor which was exposed outdoors and the evaluation is being continued.

*Example 33*

The nickel salt of N-[(2-hydroxy-4-methoxyphenyl)-(phenyl)methylene]-4-dodecylaniline, prepared as described in Example 12, also was evaluated in another sample of the polyethylene described in Example 30, with the following results:

TABLE 12

| Additive | Weather-Ometer Induction Period (Hours) | Outdoors Induction Period (Days) |
|---|---|---|
| None | 192 | 42 |
| 1% by wt. of nickel salt of N-[(2-hydroxy-4-methoxyphenyl)(phenyl)-methylene]-4-dodecylaniline | 2,160 | >381 |

Here again, it will be noted that the inhibitor was very effective in retarding deterioration of the polyethylene. The sample containing inhibitor which was exposed outdoors increased in carbonyl reading from 23 to 85 in 381 days and, accordingly, the evaluation is being continued because the sample had not developed an increase of 100 numbers in carbonyl content.

*Example 34*

The nickel salt of N-salicylidene-4-dodecyloxyaniline, prepared as described in Example 18, also was evaluated in another sample of the polyethylene described in Example 30, with the following results:

TABLE 13

| Additive | Weather-Ometer Induction Period (Hours) | Outdoors Induction Period (Days) |
|---|---|---|
| None | 192 | 42 |
| 1% by wt. of nickel salt of N-salicylidene-4-dodecyloxyaniline | 2,736 | 281 |

In the sample exposed outdoors, an increase in 100 number in carbonyl content has not been reached and the evaluation is accordingly continuing.

*Example 35*

The nickel salt of N-[(2-hydroxyphenyl)(methyl)-methylene]-4-dodecyloxyaniline, prepared as described in Example 20, also was evaluated in another sample of the polyethylene described in Example 30, with the following results:

TABLE 14

| Additive | Weather-Ometer Induction Period (Hours) | Outdoors Induction Period (Days) |
| --- | --- | --- |
| None | 192 | 42 |
| 1% by wt. of nickel salt of N-[(2-hydroxyphenyl)(methyl)methylene]-4-dodecyloxyaniline | 1,728 | >216 |

The sample containing inhibitor which was exposed outdoors had not developed an increase of 100 numbers in carbonyl reading and, accordingly, the evaluation is being continued.

*Example 36*

This example reports results of evaluations made in a commercially available low density polyethylene. These evaluations were made in the same manner as described in Example 23. The results of tests made with a sample of the polyethylene without the inhibitor and with a sample of the polyethylene containing the inhibitor are reported in the following table.

TABLE 15

| Additive | Weather-Ometer Induction Period (Hours) | Outdoors Induction Period (Days) |
| --- | --- | --- |
| None | 96 | 28 |
| 1% by wt. of nickel salt of N-salicylidene-4-dodecylaniline | 3,360 | 401 |

Here again, it will be seen that the inhibitor was very effective in retarding deterioration of the polyethylene.

*Example 37*

The nickel salt of N-[(2-hydroxyphenyl)(methyl)methylene]-4-dodecyloxyaniline, prepared as described in Example 20, also was evaluated in another sample of the polyethylene described in Example 36, with the following results:

TABLE 16

| Additive | Weather-Ometer Induction Period (Hours) | Outdoors Induction Period (Days) |
| --- | --- | --- |
| None | 96 | 28 |
| 1% by wt. of nickel salt of N-[(2-hydroxyphenyl)(methyl)methylene]-4-dodecyloxyaniline | 2,064 | >400 |

*Example 38*

As hereinbefore set forth, the inhibitor of the present invention may be used along with other additives. This example reports the results obtained when using 1% by weight of the nickel salt of N-salicylidene-4-dodecylaniline, prepared as described in Example 2, together with 0.5% by weight of B.H.T. (2-tert-butyl-4-hydroxytoluene) in another sample of the polypropylene described in Example 29. The evaluations in the Weather-Ometer were increased from 1200 hours when using the nickel salt alone to 1824 hours when using the mixture of additives. Similarly, the outdoor exposure evaluations increased from 268 days to greater than 312 days when using the mixture of additives.

*Example 39*

The nickel salt of N-salicylidene-4-dodecylaniline, prepared as described in Example 2, is used as an inhibitor in solid polybutylene. The inhibitor is incorporated by hot melt addition of the inhibitor to the polybutylene being heated and pressed on a conventional two-roll steam heated mill. The polybutylene sheets then are heat-compressed to a thickness of 20 mils, cut into plaques of 1½" x 1½" and mounted in plastic holders. The plaques are evaluated both in the Weather-Ometer and by outdoor exposure in the manner hereinbefore described in detail. The addition of the inhibitor serves to effectively inhibit carbonyl development.

*Example 40*

The nickel salt of N-o-vanillidene-4-dodecylaniline, prepared as described in Example 8, is used as an inhibitor in polystyrene. The inhibitor is incorporated in a concentration of 0.5% by weight in polystyrene by partly melting the polystyrene and incorporating the inhibitor in the hot melt. The polystyrene containing the inhibitor is of improved resistance to deterioration by ultraviolet light and due to oxidation.

*Example 41*

The nickel salt of N-salicylidene-4-dodecyloxyaniline, prepared as described in Example 18, is utilized as an inhibitor in polyvinyl chloride plastic. Here again, the inhibitor is incorporated by partly melting the polyvinyl chloride plastic and incorporating the inhibitor in the hot melt in a concentration of 1% by weight. This serves to inhibit deterioration of the polyvinyl chloride plastic due to ultraviolet light and oxidation.

*Example 42*

The nickel salt of N-salicylidene-4-dodecylaniline, prepared as described in Example 2, is used in a concentration of 0.5% by weight in nylon. The inhibitor is incorporated in a Banbury mixer and the nylon is formed into fibers in a spinnerette. This serves to inhibit deterioration of the nylon due to ultraviolet light and oxidation.

I claim as my invention:

1. Plastic normally subject to deterioration by oxidation and ultraviolet light containing, as an inhibitor against said deterioration, a small but stabilizing concentration of a metal salt of an N-(2-hydroxyphenylmethylene)-Y-phenylamine inhibitor where Y is selected from the group consisting of hydrocarbyl and hydrocarbyloxy of at least three carbon atoms, the metal of said salt being selected from the group consisting of copper, cobalt, lithium, antimony, cadmium, lead, tin, uranium ($UO_2$), vanadium, zinc, iron, mercury and nickel.

2. The composition of claim 1 wherein the metal of said metal salt is nickel.

3. The composition of claim 1 further characterized in that said plastic is a solid polyolefin.

4. The composition of claim 3 wherein said inhibitor is a metal salt of N-salicylidene-4-alkylaniline having from about 5 to about 20 carbon atoms in said alkyl group.

5. The composition of claim 4 wherein the metal of said metal salt is nickel.

6. The composition of claim 3 wherein said inhibitor is a metal salt of N-salicylidene-4-alkoxyaniline having from about 5 to about 20 carbon atoms in said alkoxy group.

7. The composition of claim 6 wherein the metal of said metal salt is nickel.

References Cited

FOREIGN PATENTS 1,147,753  4/1963  Germany.

DONALD E. CZAJA, *Primary Examiner.*

V. P. HOKE, *Assistant Examiner.*